United States Patent
Yoshida et al.

(10) Patent No.: US 7,294,265 B2
(45) Date of Patent: Nov. 13, 2007

(54) ION ADSORPTION MODULE AND METHOD FOR WATER TREATMENT

(75) Inventors: Akiko Yoshida, Tokyo (JP); Koji Yamanaka, Tokyo (JP); Hiroshi Inoue, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 10/510,964

(22) PCT Filed: Apr. 14, 2003

(86) PCT No.: PCT/JP03/08903

§ 371 (c)(1),
(2), (4) Date: Nov. 1, 2004

(87) PCT Pub. No.: WO2004/020095

PCT Pub. Date: Mar. 11, 2004

(65) Prior Publication Data

US 2005/0139549 A1 Jun. 30, 2005

(30) Foreign Application Priority Data

Aug. 28, 2002 (JP) ............................. 2002-248504

(51) Int. Cl.
*B01D 24/00* (2006.01)
(52) U.S. Cl. ..................... 210/266; 210/282; 210/284
(58) Field of Classification Search ................ 210/266, 210/282, 284
See application file for complete search history.

(56) References Cited

U.S. PATENT DOCUMENTS

| 6,841,580 B2* | 1/2005 | Inoue et al. | 521/25 |
| 6,951,609 B2* | 10/2005 | Yamanaka et al. | 210/202 |
| 7,026,364 B2* | 4/2006 | Inoue et al. | 521/25 |
| 2003/0189005 A1* | 10/2003 | Inoue et al. | 210/660 |
| 2003/0213695 A1* | 11/2003 | Yamanaka et al. | 204/632 |
| 2004/0122117 A1* | 6/2004 | Yamanaka et al. | 521/25 |

FOREIGN PATENT DOCUMENTS

| JP | 3-7938 | 1/1991 |
| JP | 08-252579 | 10/1996 |
| JP | 10-192716 | 7/1998 |
| JP | 10-192717 | 7/1998 |
| JP | 10-216717 | 8/1998 |
| JP | 10-244169 | 9/1998 |

(Continued)

*Primary Examiner*—Chester T. Barry
(74) *Attorney, Agent, or Firm*—Oblon, Spivak, McClelland, Maier & Neustadt, P.C.

(57) ABSTRACT

An ion adsorption module comprises a container with at least an opening into which feed water flows, and an organic porous ion exchange material having a three-dimensional reticular structure filled into the container, which has a continuous pore structure comprising macropores and mesopores, the macropores being interconnected with each other forming mesopores with an average diameter of 1-1,000 μm in the interconnected parts, has a total pore volume of 1-50 ml/g, contains uniformly distributed ion exchange groups, and has an ion exchange capacity of 0.5 mg equivalent/g or more of the porous material on a dry basis. The ion adsorption module can be extremely easily filled with the ion exchange material, and the packed layer does not move even if the layer is placed in an upward flow. The ion adsorption module and the water processing method using the ion exchange material are extremely useful.

7 Claims, 2 Drawing Sheets

| | FOREIGN PATENT DOCUMENTS | | WO | WO 98/59238 | * 12/1998 |
|---|---|---|---|---|---|
| JP | 2001-62312 | 3/2001 | WO | 02 83771 | 10/2002 |
| JP | 2003-230886 | 8/2003 | | | |
| WO | WO 98/03242 * | 1/1998 | * cited by examiner | | |

ION ADSORPTION MODULE AND METHOD FOR WATER TREATMENT

TECHNICAL FIELD

The present invention relates to an ion adsorption module having an ion exchange zone with a significantly small length and to a water treatment method.

BACKGROUND ART

Conventionally, ion exchange materials have been represented by polymeric synthetic resins that are generally refered to as ion exchange resins. The ion exchange resins can be classified into particulate or flaky ion exchange resins, ion exchange membranes, ion exchange fibers, and other resins, according to the types of products. There are two types of ion exchange resins, cation exchange resins and anion exchange resins. The ion exchange resins are further classified into strongly acidic cation exchange resins, weakly acidic cation exchange resins, strongly basic anion exchange resins, and weakly basic anion exchange resins according to the degree of acidity or basicity of ion exchange groups.

The strongly acidic cation exchange resin has a sulfonic acid group ($R\text{—}SO_3^-H^+$) as a functional group. As the weakly acidic cation exchange resins, resins having a carboxylic acid group ($R\text{—}COO^-H^+$), a phosphonic acid group ($R\text{—}P(O)(O^-H^+)_2$), a phosphinic acid group ($R\text{—}PH(O)(O^-H^+)$), an arsenious acid group ($R\text{—}OAsO^-H^+$), a phenoxide group ($R\text{—}C_6H_4O^-H^+$), or the like as a functional group are known. The strongly basic anion exchange resins have a quaternary ammonium base ($R\text{—}N^+R_1R_2R_3$) or a tertiary sulfonium group ($R\text{—}S^+R_1R_2$) as a functional group. The strongly basic anion exchange resin having a quaternary ammonium base of which the groups bonding to nitrogen are only alkyl groups (e.g. methyl groups) is defined as type I. The resin having a quaternary ammonium base of which the groups bonding to nitrogen include an alkanol group (e.g. —$C_2H_4OH$) is defined as type II. Type I exhibits basicity a little stronger than that of type II. The weakly basic anion exchange resins have a primary, secondary, or tertiary amine as a functional group. Various types of such resins with different types of amines have been known.

As described above, ion exchange resins are basically classified into four general types depending upon the acidity or basicity of the ionogenic group. As polymer matrices forming these resins, synthetic polymers such as a styrenic polymer, phenolic polymer, acrylic polymer, and methacrylic polymer are used. The matrix structures are classified into a geltype structure, a geltype structure with enlarged mesh sizes (porous structure), and a macroreticular (MR) structure (macroporous structure) according to the difference in the method of synthesis. The gel-type ion exchange resin is obtained by preparing a copolymer of styrene and divinylbenzene (DVB), for example, having a three-dimensional reticular structure by copolymerization in the presence of a catalyst and a dispersant and introducing a functional group into the resulting copolymer. The porous ion exchange resin is obtained by copolymerizing monomers in the presence of an organic solvent that can cause a copolymer to swell to produce a swelled copolymer with a space (gel porosity) larger than that of the gel-type ion exchange resin and introducing a functional group into the resulting copolymer. The MR ion exchange resin is obtained by copolymerizing monomers in the presence of an organic solvent that functions both as a solvent for the monomers and as a precipitant for the copolymer to produce the copolymer as an aggregate of small spherical gel particles, specifically, a matrix having large pores (macropores) among the particles, and introducing a functional group into the resulting copolymer.

In addition to the ion exchange resin particles, organic porous ion exchange resins having continuous pores have been known. For example, porous materials possessing a particle-aggregated structure have been disclosed in F. Svec, Science, 273, 205-211 (1996) and other publications. Japanese Patent Applications Laid-open No. 10-216717, No. 10-192717, No. 10-192716, and No. 8-252579 disclose particle-aggregated porous ion exchange materials in which a mixture of a cation exchange resin and an anion exchange resin is bound using a binder polymer. These particle-aggregated porous ion exchange materials are produced by binding organic fine particles or ion exchange resin particles, into which ion exchange groups have been previously introduced, with a binder polymer, or by filling a specific mold with these fine particles and heating the particles to melt and bind, optionally introducing ion exchange groups into the binder polymer.

Since these particle-aggregated porous materials have a small pore volume and tiny mesopore sizes due to the particle-aggregated structure, their applications to a process at a large flow rate under a low pressure are limited. In addition, ion exchange groups and the like are not uniformly distributed in these particle-aggregated porous materials. Specifically, in these porous structures, ion exchange groups are not present in the binder polymer or, even if present, the structures of the polymer matrix and ion exchange groups in the binder polymer are different from those in the ion exchange resin. In addition, the density of the ion exchange groups in the binder polymer is smaller than that in the ion exchange resin. Such porous structures do not form homogeneous ion exchange materials as a whole. Adsorbed ions thus easily diffuse in the flow direction in a module. In addition, the length of an ion exchange zone in which both the ion adsorbed part and the ion non-adsorbed part are present becomes large, resulting in leakage of a slight amount of the adsorbed ions. Therefore, the module must be replaced frequently.

In an ion adsorption column module commonly used in the art that is filled with a mixture of ion exchange resin particles, feed water is caused to pass through the ion exchange resin layer to remove ionic impurities. To fill the column with the mixture of ion exchange resin particles, it is necessary to provide a supply means to feed and supply a slurry containing the mixture of ion exchange resin particules. In addition, the column must be filled with the slurry so that the slurry is not spilled off from the column. The filling operation is not an easy task. The ion exchange resin particles are regenerated in an upward flow by separating a cation exchange resin and an anion exchange resin by specific gravity and regenerating the resins separately using regenerant chemicals. In an upward flow, only a low regeneration efficiency can be achieved due to ease with which the packed layers are moved and difficulty in separating the ion exchange resins by specific gravity.

Accordingly, an object of the present invention is to provide an ion adsorption module which can be easily filled with an ion exchange material and in which the packed resin layer does not move even if subjected to an upward flow. Another object of the present invention is to provide an ion adsorption module and a water treatment method, wherein the length of the ion exchange zone may be small even at an increased flow rate, allowing the ion exchange apparatus to have a reduced size, and leakage of even a slight amount of adsorbed ions does not occur, resulting in a reduced regeneration frequency and an improved treatment efficiency.

DISCLOSURE OF THE INVENTION

In an attempt to overcome the above-mentioned shortcomings to the prior art, the present inventors have conducted extensive studies and have found that, when feed water, preferably feed water that has been treated in advance using commonly used ion exchange resin particles, is treated by causing the water to come in contact with an organic porous ion exchange material having a special structure, the length of the ion exchange zone may be small even at an increased flow rate, allowing the ion exchange apparatus to have a reduced size, and leakage of even a slight amount of adsorbed ions does not occur, resulting in a reduced regeneration frequency and an improved treatment efficiency. These findings have led to the completion of the present invention.

The first invention provides an ion adsorption module comprising a container with an opening into which feed water flows and an organic porous ion exchange material having a three-dimensional reticular structure filled into the container, which ion exchange material has a continuous pore structure comprising macropores and mesopores, the macropores being interconnected with each other forming mesopores with an average diameter of 1-1,000 μm in the interconnected parts, has a total pore volume of 1-50 ml/g, contains uniformly distributed ion exchange groups, and has an ion exchange capacity of 0.5 mg equivalent/g or more of the porous material on a dry basis. In accordance with the present invention, the porous ion exchange material can be easily formed into, for example, a block shape that can fit into a container. It is easy to fill the container with the ion exchange material. The packed layer does not move even if the layer is placed in an upward flow. The module can be applied to both a continuous water passage treatment method commonly used for a conventional module and a batch treatment method operated by immersing the module in water in a storage container or storage tank. In the continuous water passage treatment method, when the amount of ionic impurities is slight, the length of the ion exchange zone may be small even in a compact container at an increased flow rate, allowing the ion exchange apparatus to have a reduced size, and leakage of a slight amount of adsorbed ions does not occur, resulting in a reduced regeneration frequency and an improved treatment efficiency.

The second invention provides an ion adsorption module as described in the first invention, wherein the container is provided with a feed water inflow pipe connected to an opening into which feed water flows and a treated water outflow pipe. The present invention exhibits the same effect as in the first invention and can be applied, in particular, to a continuous water passage treatment method.

The third invention provides an ion adsorption module, wherein the organic porous ion exchange material is an organic porous cation exchange material and an organic porous anion exchange material, and the module is filled with a stratified bed of the organic porous cation exchange material and the organic porous anion exchange material. In the present invention, the module can be particularly easily filled with the porous ion exchange material, and the packed layers does not move even if the layers is placed in an upward regenerant flow.

The fourth invention provides an ion adsorption module, comprising a layer of ion exchange resin particles and a layer of an organic porous ion exchange material having a three-dimensional reticular structure, which has a continuous pore structure comprising macropores and mesopores, the macropores being interconnected with each other forming mesopores with an average diameter of 1-1,000 μm in the interconnected parts, has a total pore volume of 1-50 ml/g, contains uniformly distributed ion exchange groups, and has an ion exchange capacity of 0.5 mg equivalent/g or more of the porous material on a dry basis, stratified in that order. By disposing the exchange resin particles on the upstream side and the organic porous ion exchange material on the downstream side, a large amount of ionic impurities are first removed and the residual ionic impurities are removed at a high efficiency. This stratified configuration can reduce the total length of the ion exchange zone and downsize the ion exchange column. Adsorption efficiency of the column at a high flow rate can thus be improved.

The fifth invention provides an ion adsorption module, wherein the module is disposed on the downstream side of another ion adsorption module filled with ion exchange resin particles. The present invention exhibits the same effect as in the fourth invention.

The sixth invention provides a water treatment method, comprising removing ionic substances from feed water by adsorption by causing the feed water to come in contact with an organic porous ion exchange material having a three-dimensional reticular structure, which has a continuous pore structure comprising macropores and mesopores, the macropores being interconnected with each other forming mesopores with an average diameter of 1-1,000 μm in the interconnected parts, has a total pore volume of 1-50 ml/g, contains uniformly distributed ion exchange groups, and has an ion exchange capacity of 0.5 mg equivalent/g or more of the porous material on a dry basis. The present invention exhibits the same effect as in the first to third inventions.

The seventh invention provides a water treatment method, wherein the feed water has been processed in advance using ion exchange resin particles. The present invention exhibits the same effect as in the fourth and fifth inventions.

BEST MODE FOR CARRYING OUT THE INVENTION

Figure 1:
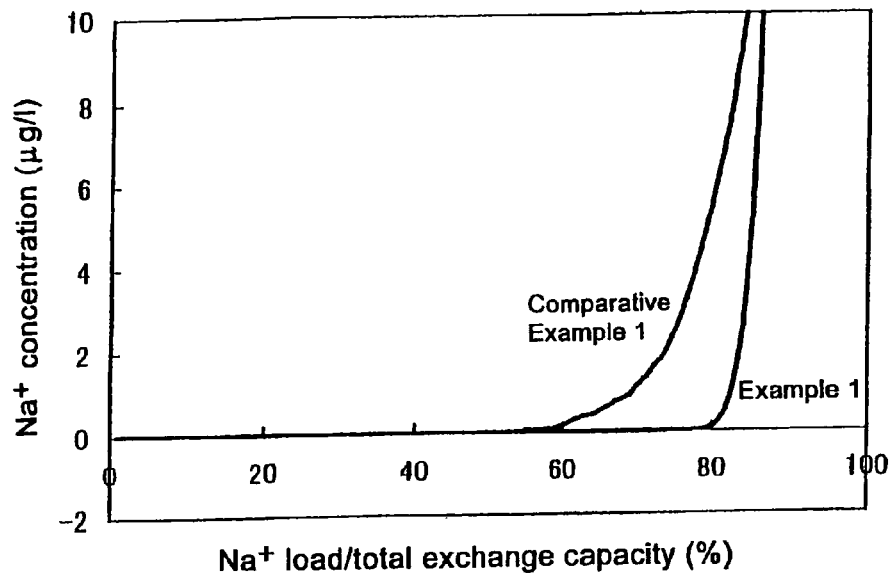
FIG. 1 is a diagram showing the relationship between the $Na^+$ load/total exchange capacity and the $Na^+$ concentration in the treated water in a water passage experiment 1.

The basic structure of an organic porous ion exchange material (hereinafter may be referred to as "porous ion exchange material") to be filled into the ion adsorption module in an embodiment of the present invention is a continuous pore structure which comprises macropores and mesopores, the macropores being interconnected with each other forming mesopores with an average diameter of 1-1,000 μm, and preferably 10-100 μm in the interconnected macropores. Specifically, the continuous pore structure usually includes a structure in which macropores with an average diameter of 2-5,000 μm overlap. The overlapping section has mesopores functioning as common openings, most of the mesopores having an open pore structure. In the open pore structure, pores formed from the macropores and the mesopores become flow paths for water. If the average diameter of the mesopores is less than 1 μm, pressure loss during water passage is too great. The average diameter of the mesopores of more than 1,000 μm, on the other hand, results in difficulty in forming uniform flow paths for water. The porous ion exchange material with the above continuous pore structure can remarkably increase the pore volume and the specific surface area.

The organic porous ion exchange material has a total pore volume of 1-50 ml/g. If the total pore volume is less than 1 ml/g, the amount of water passing through a unit area becomes small, allowing only limited passage of water. On the other hand, a total pore volume of more than 50 ml/g leads to a decrease in the proportion occupied by the matrix such as a polymer, resulting in very weak strength of the porous material. The material for the matrix forming the continuous pore structure is an organic polymer material having chemical restraints such as a crosslinking structure and physical restraints such as crystals. When the polymer material contains a crosslinking structure, the amount of the crosslinking structural units is preferably in the range of 5-90 mol % of the total amount of all structural units forming the polymer material. If the amount of the crosslinking structural units is less than 5 mol %, mechanical strength is insufficient. If the amount is more than 90 mol %, it is difficult to introduce ion exchange groups, resulting in a product with an insufficient ion exchange capacity. There are no specific limitations to the type of the polymer material. Examples of the polymer material include styrenic polymers such as polystyrene, poly(α-methylstyrene), and poly(vinyl benzyl chloride), and crosslinked materials of these polymers; polyolefins such as polyethylene and polypropylene, as well as crosslinked materials of these polymers; halogenated polyolefins such as polyvinyl chloride and polytetrafluoroethylene, as well as crosslinked materials of these polymers; nitrile-containing polymers such as polyacrylonitrile and crosslinked materials of these polymers; (meth) acrylic polymers such as poly(methyl methacrylate) and poly(ethyl acrylate), as well as crosslinked materials of these polymers; a styrene-divinylbenzene copolymer, and a vinyl benzyl chloride-divinylbenzene copolymer. The above polymers may be either homopolymers obtained by polymerizing one type of monomer or copolymers obtained by polymerizing two or more types of monomers. In addition, a blend of two or more polymers may be used. Among these organic polymers, a styrene-divinylbenzene copolymer and a vinyl benzyl chloride-divinylbenzene copolymer are preferable in view of ease of introduction of ion exchange groups and high mechanical strength. The continuous pore structure of the porous ion exchange material can be observed comparatively easily using a scanning electron microscope (SEM).

The porous ion exchange material used in the present invention contains uniformly distributed ion exchange groups and has an ion exchange capacity of 0.5 mg equivalent/g or more, and preferably 2.0 mg equivalent/g or more of the porous material on a dry basis. If the ion exchange capacity is less than 0.5 mg equivalent/g of the porous material on a dry basis, the ion adsorption capacity is insufficient, and the module or the like must be replaced frequently. If ion exchange groups are not uniformly distributed, adsorbed ions easily diffuse in the flow direction in a module. Thus, the length of an ion exchange zone in which both the ion adsorbed part and the ion non-adsorbed part are present in a module becomes large. Leakage of a slight amount of adsorbed ions thereby easily occurs, and the module must be replaced frequently. The "uniform distribution of ion exchange groups" herein refers to uniformity of ion exchange group distribution in the order of μm or less. Distribution conditions of ion exchange groups can be identified comparatively easily by using an analytical technique such as electron probe microanalysis (EPMA) or secondary ion mass spectrometry (SIMS). As the ion exchange groups to be introduced into the porous ion exchange material, cation exchange groups such as a carboxylic acid group, iminodiacetic acid group, sulfonic acid group, phosphoric acid group, aminophosphoric acid group, iminophosphoric acid group, and aromatic hydroxyl group; anion exchange groups such as a quaternary ammonium group, tertiary amino group, secondary amino group, primary amino group, polyethyleneimine, tertiary sulfonium group, and phosphonium group; amphoteric ion exchange groups such as betaine and sulfobetaine; and chelate-forming groups such as an iminodiacetic acid group, phosphoric acid group, phosphate group, aminophosphoric acid group, iminophosphoric acid group, aromatic hydroxyl group, aliphatic polyol, and polyethyleneimine can be given. The porous ion exchange material can be provided by introducing these groups individually or in combination of two or more according to the intended application.

The porous ion exchange material used in the present invention must have a sponge structure with an open cell structure with cells open to the outside. The sponge structure used herein indicates a bubble-dispersed porous material in which bubbles are dispersed in a solid as defined by You Takeuchi, Properties of Porous Materials and Application Technologies, pp. 2-5, Fuji Technosystems (2000). This is quite different from the particle-aggregated porous materials disclosed in Japanese Patent Applications Laid-open No. 10-216717, No. 10-192717, No. 10-192716, and No. 8-252579. The sponge structure of the porous material ensures uniform formation of the cell structure and, at the same time, remarkably increases the total pore volume and the specific surface area as compared with particle-aggregated porous materials. As described above, since ion exchange groups and the like are uniformly distributed in the porous ion exchange material of the present invention, only a small amount of adsorbed ions diffuse in the flow direction in the module, and the length of the ion exchange zone is reduced, whereby leakage of even a slight amount of the adsorbed ions hardly occurs. Therefore, the module can be used in a stable manner for a long period of time.

There are no specific limitations to the method for producing the porous ion exchange material. A method of producing the porous ion exchange material from components containing ion exchange groups in one step, and a method of first producing a porous material from components not containing an ion exchange group and then introducing ion exchange groups can be given as examples. One example of the method for producing the porous ion exchange material will now be described. The method for producing the porous ion exchange material comprises preparing a water-in-oil emulsion by mixing an oil-soluble monomer not containing an ion exchange group, a surfactant, water, and, as required, a polymerization initiator, polymerizing the water-in-oil emulsion to obtain a porous material, and introducing ion exchange groups into the porous material.

The oil-soluble monomer not containing an ion exchange group indicates a lipophilic monomer that does not contain an ion exchange group such as a carboxylic acid group or sulfonic acid group and has low solubility in water. Specific examples of such a monomer include styrene, α-methylstyrene, vinyl toluene, vinyl benzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers can be used either individually or in combination of two or more. However, to obtain necessary mechanical strength for introducing many ion exchange groups in a later step, it is desirable to select a crosslinking monomer such as divinylbenzene or ethylene glycol dimethacrylate as at least one monomer component, and incorporate such a monomer in an amount of 1-90 mol %, and preferably 3-80 mol % of the total amount of the oil-soluble monomers.

There are no specific limitations to the type of the surfactant inasmuch as a water-in-oil (w/o) emulsion can be formed when the oil-soluble monomer not containing an ion exchange group is mixed with water. Nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzene sulfonate, and dioctyl sodium sulfosuccinate; cationic surfactants such as distearyl dimethyl ammonium chloride; and amphoretic surfactants such as lauryl dimethyl betaine can be used as the surfactant. These surfactants may be used either individually or in combination of two or more. The "water-in-oil emulsion" refers to an emulsion having a continuous oil phase in which water droplets are dispersed. Although the amount of the above surfactant to be added significantly varies according to the type of the oil-soluble monomer and the size of the target emulsion particles (macropores), a specific amount of the surfactant can be selected in the range of about 2% to 70% of the total amount of the oil-soluble monomer and the surfactant. In addition, although not necessarily essential, alcohols such as methanol and stearyl alcohol, carboxylic acids such as stearic acid, or hydrocarbons such as benzene, toluene, octane, and dodecane may be added to the reaction system to control the shape and size of foams in the porous ion exchange material, inasmuch as micropores as noncontinuous pores are not formed.

A compound that generates radicals by heat or light is suitably used as the polymerization initiator. The polymerization initiator may be either water-soluble or oil-soluble. Examples of the initiator include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, and tetramethylthiuram disulfide. In some reaction systems, polymerization proceeds only by heat or light even if the polymerization initiator is not added. In such a case, the polymerization initiator need not be added.

There are no specific limitations to the method of mixing the oil-soluble monomer not containing an ion exchange group, the surfactant, water, and the polymerization initiator to prepare a water-in-oil emulsion. A method of mixing these components all together, a method of preparing a homogeneous mixture of oil-soluble components, which include the oil-soluble monomer, surfactant, and oil-soluble polymerization initiator, and a homogeneous solution of aqueous components, which include water and the water-soluble polymerization initiator, and mixing the mixture with the solution, and other similar methods can be used. There are also no specific limitations to the mixing apparatus for forming an emulsion. Conventional mixers, homogenizers, high-pressure homogenizers, planet-type stirrers, and the like can be used under emulsification conditions arbitrarily selected for obtaining an emulsion having a target particle size.

Various polymerization conditions can be selected for polymerizing the water-in-oil emulsion thus obtained according to the types of the monomer and the polymerization initiator. For example, when azobisisobutyronitrile, benzoyl peroxide, potassium persulfate, or the like is used as the polymerization initiator, the emulsion may be polymerized with heating at 30-100° C. for 1-48 hours in a sealed vessel in an inert atmosphere. When hydrogen peroxide-iron chloride, sodium persulfate-acidic sodium sulfite, or the like is used as the polymerization initiator, the emulsion may be polymerized at 0-30° C. for 1-48 hours in a sealed vessel in an inert atmosphere. After the polymerization, the reaction mixture is removed from the reaction vessel and, if necessary, extracted with a solvent such as isopropanol to remove the unreacted monomer and the surfactant, thereby yielding a porous material.

Although there are no specific limitations to the method for introducing ion exchange groups into the porous material, a polymer reaction that can densely and uniformly introduce ion exchange groups is preferably used as the method. For example, as a method for introducing a sulfonic acid group when the organic porous material is a styrene-divinylbenzene copolymer or the like, a method of sulfonating using chlorosulfuric acid, concentrated sulfuric acid, or fuming sulfuric acid, or the like can be given. As a method for introducing a quaternary ammonium group when the organic porous material is a styrene-divinylbenzene copolymer or the like, a method of introducing a chloromethyl group using chloromethyl methyl ether or the like and reacting the resulting product with a tertiary amine; a method of preparing an organic porous material by copolymerizing chloromethylstyrene and divinylbenzene, and then reacting the copolymer with a tertiary amine; or the like can be given. As a method for introducing betaine, a method of introducing a tertiary amine into the organic porous material by the method described above and then reacting the resulting product with monoiodoacetic acid or the like can be given. As a method of introducing an aliphatic polyol which is a chelate-forming group, a method of reacting an organic porous material having a chloromethyl group with N-methylglucamine or the like can be given. As the ion exchange groups to be introduced, cation exchange groups such as a carboxylic acid group, iminodiacetic acid group, sulfonic acid group, phosphoric acid group, aminophosphoric acid group, iminophosphoric acid group, and aromatic hydroxyl group; anion exchange groups such as a quaternary ammonium group, tertiary amino group, secondary amino group, primary amino group, polyethyleneimine, tertiary sulfonium group, and phosphonium group; ampholytic ion exchange groups such as betaine and sulfobetaine; and chelate-forming groups such as an iminodiacetic acid group, phosphoric acid group, phosphate group, aminophosphoric acid group, iminophosphoric acid group, aromatic hydroxyl group, aliphatic polyol, and polyethyleneimine can be given. These groups are introduced individually or in combination of two or more to obtain a porous ion exchange material.

In the method for producing a porous ion exchange material, a water-in-oil emulsion may be prepared by adding a precipitant to an oil-soluble monomer in the step prior to polymerization and then polymerizing the solution. The precipitant is a poor solvent for a polymer that is obtained by polymerizing an oil-soluble monomer and can dissolve the oil-soluble monomer. When the precipitant is added, minute unevenness can be formed on the surface of the paths in the pore structure of the porous material, whereby adsorption performance of the porous material can increase. Various precipitants can be selected according to the type of the oil-soluble monomer. For example, when a mixture of styrene and divinylbenzene is used as the oil-soluble monomer, aliphatic hydrocarbons such as hexane, heptane, octane, isooctane, and decane; and alcohols such as 1-butanol, 2-butanol, 2-methyl-2-butanol, and methyl isobutyl carbinol can be used as the precipitant. The amount of the precipitant added, which varies according to the content of divinylbenzene in the oil-soluble monomer, can be set in the range of 10-70%, and preferably 20-60%, of the total amount of the oil-soluble monomer and the precipitant. When the precipitant is added, a polymer of styrene and divinylbenzene at the initial stage is dissolved in oil components such as an oil-soluble monomer only with difficulty. The polymer is thus precipitated as microparticles. The microparticles form an aggregate to develop minute unevenness on the surface. If the amount of the precipitant added is too large, many micropores are developed, but strength of the micropores may decrease. If the amount is too small, it is difficult to develop micropores. The pore diameter of the micropores can be controlled by appropriately setting the amount of the precipitant or the mixing ratio of the crosslinking monomer and the precipitant. Examples of the method for forming micropores include, in addition to the method of adding the precipitant, a method of adding a linear polymer obtained by polymerizing an oil-soluble monomer, a method of adding the precipitant together with a swelling agent that is a good solvent for the polymer obtained by polymerizing an oil-soluble monomer, and a method of using the linear polymer and the swelling agent or precipitant in combination.

The ion adsorption module in an embodiment of the present invention comprises a container having at least one opening into which feed water flows and the porous ion exchange material to be filled into the container. When the container is provided only with one opening into which feed water flows, the ion adsorption module can be applied to a batch treatment method, wherein the module is placed in water in a storage container or storage tank for purifying the water. When the container is provided with a feed water inflow pipe into which feed water flows and a treated water outflow pipe from which treated water flows, the module can be applied to a continuous water treatment method that has been conventionally used. There are no specific limitations to the method for causing feed water to come in contact with the ion adsorption module, insofar as the water can come in contact with the porous ion exchange material. Examples include a method of causing water to pass through a simple columnar or prismatic packed layer in an upward or downward flow, an external pressure (outward-in) method of causing water to pass through a cylindrical packed layer from the outside of the cylinder circumference to the cylinder inside, an internal pressure (inward-out) method of causing water to pass through a cylindrical packed layer from the cylinder inside to the outside of the cylinder circumference, a tubular method of causing water to pass through a layer of a large number of cylinders of organic porous material by the internal or external pressure method, a flat membrane method using a sheet-like packed layer, and a pleat method using a folded flat membrane.

As the shape of the porous ion exchange material to be filled, a block-like shape, sheet-like shape, plate-like shape, columnar shape, cylindrical shape, or the like is selected according to the shape of the container used for the module in a form capable of adsorbing ions. Small globular or amorphous particulate blocks with a size of 0.1-10 mm may be provided as the porous ion exchange material. The small blocks are filled into a container to form a packed layer. As a method for forming these various shapes of porous ion exchange materials, a method of cutting a block-like porous ion exchange material, a method of filling a mold of an objective shape with an emulsion and polymerizing the emulsion in the mold, or the like can be given.

The type of the porous ion exchange material to be filled into a container and the method of filling the container with the material are not specifically limited, and can be arbitrarily determined according to the object of use and the type of ionic impurities to be adsorbed. As a specific example, a method of filling a container with a porous cation exchange material or a porous anion exchange material individually or in combination can be given. As a method of filling a container with these porous ion exchange materials in combination, a method of layering the materials molded or fabricated in the shape of a block, sheet, plate, or column in the water passage direction in a container, a method of filling a container with a mixture of small block ion exchange materials, or the like can be given. Of these, a method of filling a container with the porous cation exchange material and the porous anion exchange material in layers is preferable, since the porous ion exchange materials can be provided and filled into a container with ease.

In another embodiment, the ion exchange module comprises a layer of ion exchange resin particles and a layer of the porous ion exchange material stratified in that order. In still another embodiment, the ion adsorption module comprises an ion adsorption module filled with the porous ion exchange material, which is disposed on the downstream side of another ion adsorption module filled with ion exchange resin particles. A connection pipe may be omitted in the module of the former embodiment, which is a feature differing from the feature of the module in the latter embodiment. By disposing conventional ion exchange resin particles in the upstream part and the porous ion exchange material in the downstream part, a large amount of ionic impurities are first removed and the residual ionic impurities can be removed at a high efficiency. This configuration can reduce the total length of the ion exchange zone and can downsize the ion adsorption column. Adsorption efficiency of the column at a high flow rate can thus be improved. A mixture of cation exchange resin particles and anion exchange resin particles is preferably used as the ion exchange resin particles on the upstream side. The porous ion exchange material on the downstream side is preferably a layer obtained by layering a porous cation exchange material and a porous anion exchange material.

The shape of the ion exchange module used in the present invention is not specifically limited. The module may have a columnar shape, a flat shape, a tower-like shape with a disk section in the lower part, or the like. The flat (snare drum-like) ion exchange module comprises an ion exchange material layer having a length in the water passage direction and a diameter in the direction perpendicular to the water passage direction which is greater than the length. The module is suitable for a water treatment method of carrying out water passage and regeneration in a short period of time. An ion exchange column provided with a dish bottom is used as the module in the above embodiment filled with the ion exchange resin particles and the porous ion exchange material in layers. The conventional ion exchange column provided with a dish bottom in the lower part comprises a deionization section on the upstream side filled with the ion exchange resin particles and a dished bottom on the downstream side provided with or filled with a perforated plate or pumices (Tekapore) that function as a distributor. However, the ion exchange module in this embodiment may be filled with the porous ion exchange material in place of the perforated plate or pumices (Tekapore) in the dished bottom section. Efficiency in adsorbing ionic impurities at a high flow rate thus increases. Further, the number of parts in the column can be reduced, because the porous ion exchange material functions as a distributor. In addition, regeneration efficiency can be improved, because the packed layer does not move by regeneration in an upward flow.

In the ion adsorption module of the present invention, the porous ion exchange material can be formed into, for example, a block shape that can fit in a container. The ion exchange material with such a shape can easily be filled into the container. Conventionally, ion exchange resins have been regenerated in an upward flow by separating a cation exchange resin and an anion exchange resin by specific gravity and regenerating the resins separately using chemicals. In an upward flow, only a low regeneration efficiency is achieved due to ease with which the packed layers are moved and difficulty in separating the ion exchange resins by specific gravity. However, in the ion adsorption module of the present invention, the packed layers are not moved even if these layers are placed in an upward flow.

The present invention provides the following water treatment methods. The first water treatment method comprises causing feed water to come in contact with the porous ion exchange material to remove ionic impurities in the feed water by adsorption. The second water treatment method comprises causing feed water to come in contact with ion exchange resin particles to obtain first treated water and causing the first treated water to come in contact with the porous ion exchange material to obtain second treated water. The first water treatment method can be suitably used for treating feed water containing a slight amount of ionic impurities, for example, feed water having a conductivity of 0.1-100 mS/m, using a small apparatus that can be easily filled with the porous ion exchange material to be frequently regenerated. Since the length of the ion exchange zone can may be small even at a high flow rate, the size of the ion exchange material apparatus can be reduced. In the second water treatment method, a high adsorption rate of ionic impurities can be achieved even if the feed water contains only a small amount of the impurities, and leakage of the adsorbed ions hardly occurs. Since the ion exchange resin particles have a particle diameter of 0.2-0.5 mm, the diffusion rate in the particles significantly differs from the diffusion rate outside the particles. When the flow rate increases, the length of the ion exchange zone in which both the ion adsorbed part and the ion non-adsorbed part are present becomes large, whereby leakage of a slight amount of the adsorbed ions occurs. However, ions can be roughly collected because the resin has a large total exchange capacity. On the other hand, in the organic porous ion exchange material having a three-dimensional reticular structure, the total exchange capacity is small, but the diffusion rate does not significantly vary. As a result, the length of the ion exchange zone may be small even at a high flow rate. By disposing the ion exchange resin particles on the upstream side and the organic porous ion exchange material on the downstream side, a large amount of ionic substances are first removed and the residual ions are removed at a high efficiency. This configuration can reduce the total length of the ion exchange zone and downsize the ion adsorption column. Adsorption efficiency of the column at a high flow rate can thus be improved. Therefore, the ion adsorption module can be an alternative to a cartridge polisher used as a subsystem in a conventional ultrapure water production apparatus, for example.

The water treatment method of the present invention may be a method comprising converting the ionic form of the porous ion exchange material into one having adsorption selectivity lower than that of the target ions to be removed in feed water and causing the water to pass through the material to remove the objective ions in the water by adsorption, while discharging the ions having lower adsorption selectivity to the feed water. Specifically, when the ions to be removed are calcium ions or magnesium ions, sodium ions having adsorption selectivity lower than calcium ions or magnesium ions are adsorbed on the porous ion exchange material and used for treating water. This method is suitable for treating water such as boiler feed water, of which the main objective is to prevent adhesion of scale. Because not necessarily all ions have to be removed in such a process, the porous ion exchange material can be regenerated at a low cost with safety. The water treatment method of the present invention may be a softening treatment method comprising providing a cation exchange material as the porous ion exchange material, converting the cation in the cation exchange material into sodium, causing feed water to pass, and exchanging hardness components in the feed water for sodium. Hardness components in feed water can be easily removed using this method.

Since the porous ion exchange material and the ion exchange module used for the water treatment method of the present invention can be repeatedly used for removing ions by adsorption by chemically regenerating the porous ion exchange material. As a regeneration method, a method of causing an acid to come in contact with a porous cation exchange material or causing an alkali to come in contact with a porous anion exchange material to desorb ionic substances adsorbed on the porous ion exchange material can be given. Examples of the acid include hydrochloric acid, sulfuric acid, and nitric acid. Examples of the alkali include caustic soda. The chemical may make contact with the porous ion exchange material either in an upward flow or in a downward flow without specific limitations. When another ion exchange material of the some ionogenic group as that of the porous ion exchange material such as ion exchange resin particles is present together with the porous ion exchange material, these ion exchange materials do not need to be separated during the regenerating operation.

EXAMPLES

The present invention will be described in more detail by examples, which should not be construed as limiting the present invention.

Example 1

(Preparation of Porous Ion Exchange Material)

Styrene (15.9 g), divinylbenzene (6.8 g), and sorbitan monooleate (10.3 g) were mixed and homogeneously dissolved. Next, potassium persulfate (0.60 g) was dissolved in deionized water (450 ml). The aqueous solution was added to the styrene/divinylbenzene/sorbitan monooleate mixture previously prepared. The resultant mixture was homogeneously emusified using a homogenizer. After the emulsification, the emulsion was fed into an autoclave. The internal atmosphere was sufficiently displaced with nitrogen and the autoclave was sealed. The emulsion was allowed to stand at 60° C. for 24 hours to carry out polymerization. After the polymerization, the reaction mixture was extracted with isopropanol for 18 hours using a Soxhlet extractor to remove the unreacted monomers and sorbitan monooleate, and dried overnight at 40° C. under reduced pressure. Tetrachloroethane (200 g) was added to an aliquot (5 g) of the porous material of the styrene/divinylbenzene copolymer thus obtained. The mixture was heated at 60° C. for 30 minutes. After cooling to room temperature, chlorosulfuric acid (25 g) was slowly added and the mixture was reacted at room temperature for four hours. Next, acetic acid was added to the reaction product. The mixture was poured into a large amount of water, washed with water, and dried to obtain a porous cation exchange material. The ion exchange capacity of the porous material was 4.0 mg equivalent/g of the porous material on a dry basis. Sulfur atom mapping by EPMA confirmed that the porous material contained sulfonic acid groups uniformly introduced therein. The porous material had an open cell structure with cells open to the outside. The average cell diameter was 3 µm, and the total pore volume was 22 ml/g.

(Preparation of Ion Adsorption Module)

The porous cation exchange material obtained in Preparation in Example 1 was cut in wet conditions and filled in a column with a diameter of 2.55 cm and a height of 30 cm. After regeneration using 1 N hydrochloric acid, the porous cation exchange material was sufficiently washed with ultrapure water to be in a regenerated form. The ion adsorption module A was thus obtained.

(Water Passage Experiment 1)

Sodium chloride was added to deionized water to prepare a simulated deionized water sample polluted at a low concentration. The life of the ion adsorption module A was tested by causing the water to pass through the module. The concentration of sodium chlodide in the simulated polluted deionized water sample caused to permeate through the ion adsorption module was 250 µg/l. The flow rate of water through the ion adsorption module was LV=30 m/hr. The amount of adsorbed sodium ions accounting for the total exchange capacity when the sodium concentration in the treated water exceeded 1 µg/l (sodium ion adsorption rate) was determined. The results are shown in FIG. 1. As is clear from FIG. 1, the adsorption rate of the porous cation exchange material was 83%. The length of the ion exchange zone was small as shown by the symbol a.

Comparative Example 1

The same experiment as in the above water passage experiment 1 was carried out, except for using cation exchange resin particles Amberlite IR120B (manufactured by Rohm and Haas Company), instead of the porous cation exchange material, as an ion exchange material for filling the ion adsorption module. The results are shown in FIG. 1. As is clear from FIG. 1, the adsorbtion rate of the cation exchange resin was 70%. The length of the ion exchange zone was larger than the length in the case of Example 1, as shown by the symbol b.

Example 2

(Preparation 2 of Porous Ion Exchange Material)

A porous material comprising a p-chloromethylstyrene/divinylbenzene copolymer was produced in the same manner as in Example 1, except for using p-chloromethylstyrene (15.9 g) instead of styrene (15.9 g). Dioxane (200 g) was added to an aliquot (5 g) of the porous material and the mixture was heated at 80° C. for 30 minutes. After cooling to room temperature, an aqueous solution (65 g) of 30% trimethylamine was slowly added. The mixture was reacted at 50° C. for three hours and then allowed to stand overnight at room temperature. After the reaction, the porous material was removed from the reaction product, washed with acetone and then with water, and dried to obtain a porous anion exchange material. The ion exchange capacity of the porous material was 3.5 mg equivalent/g of the porous material on a dry basis. SIMS analysis confirmed that the porous material contained trimethylammonium groups uniformly introduced therein. The porous ion exchange material had an open cell structure with cells open to the outside. The average cell diameter was 3 µm, and the total pore volume was 22 ml/g.

(Preparation of Ion Adsorption Module)

The porous cation exchange material obtained in Preparation in Example 2 was cut in wet conditions and filled in a column with a diameter of 2.55 cm and a height of 30 cm. After regeneration using 1 N caustic soda, the porous ion exchange material was sufficiently washed with ultrapure water to be in a regenerated form. The ion adsorption module B was thus obtained.

(Water Passage Experiment 2)

Figure 2:
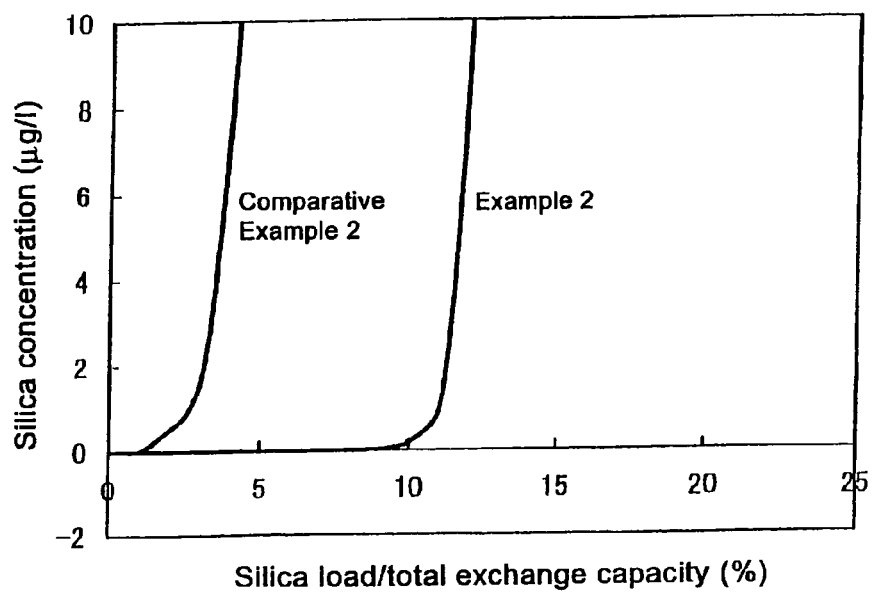
FIG. 2 is a diagram showing the relationship between the silica load/total exchange capacity and the concentration of silica in the treated water in a water passage experiment 2.

The same experiment as in the water passage experiment 1 was carried out, except for using the ion adsorption module B instead of the ion adsorption module A and using a simulated deionized water sample polluted with silica at a low concentration (silica concentration: 17.5 µg/l) instead of the simulated deionized water sample polluted with sodium chloride. The results are shown in FIG. 2. As is clear from FIG. 2, the ion adsorption rate was 12% when the silica concentration in the treated water obtained by causing water to pass through the ion adsorption module B exceeded 1 µg/l.

Comparative Example 2

The same experiment as in the water passage experiment 2 was carried out, except for using anion exchange resin particles Amberlite IRA402BL (manufactured by Rohm and Haas Conpany) instead of the porous cation exchange material, as an ion exchange material for filling the ion adsorption module. The results are shown in FIG. 2. As is clear from FIG. 2, the ion adsorption rate was 2.7% when the silica concentration in the treated water exceeded 1 µg/l.

Examples 3-5

Figure 3:
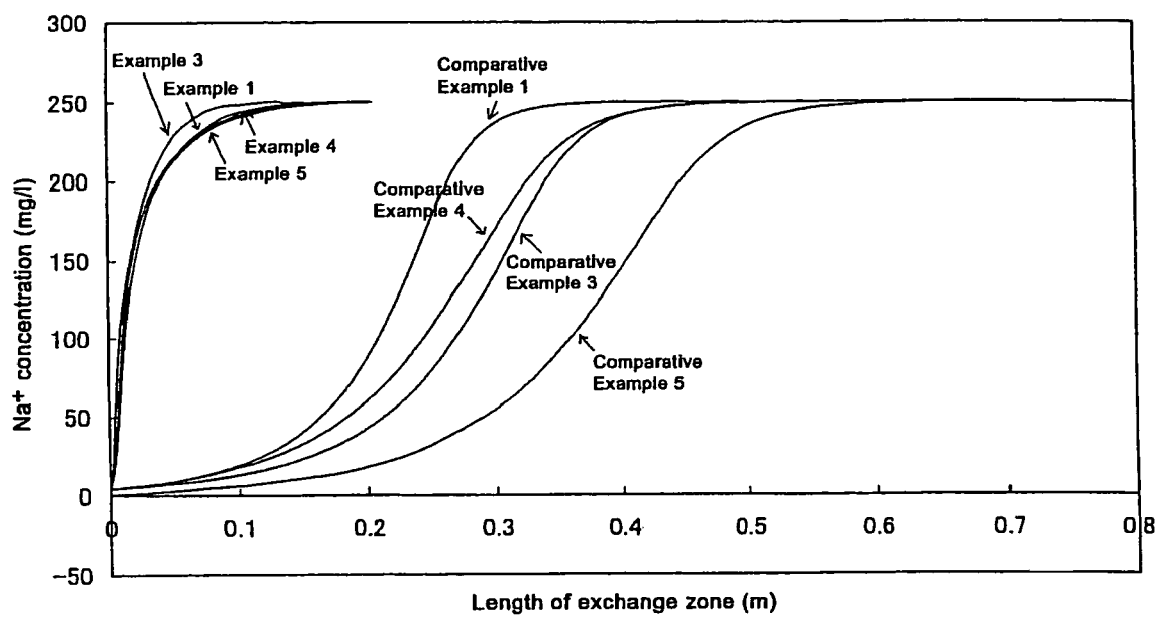
FIG. 3 is a diagram showing the relationship among the water passage flow rate, the length of the exchange zone, and the $Na^+$ concentration in the treated water in the water passage experiment 1.

The water passage experiments were carried out in the same manner as in the water passage experiment in Example 1, except that the flow rates of water through the ion adsorption module (LV) were respectively 20 m/hr (Example 3), 50 m/hr (Example 4), and 70 m/hr (Example 5). The results are shown in FIG. 3. The results of Example 1 are also shown in FIG. 3.

Comparative Examples 3-5

The water passage experiments were carried out in the same manner as in the water passage experiment in Comparative Example 1, except that the flow rates of water through the ion adsorption module (LV) were respectively 50 m/hr (Comparative Example 3), 70 m/hr (Comparative Example 4), and 90 m/hr (Comparative Example 5). The results are shown in FIG. 3. The results of Comparative Example 1 are also shown in FIG. 3.

As is clear from FIGS. 1 and 2, the adsorption rate is high and the leakage proceeds slowly in the ion adsorption modules of Examples 1 and 2 as compared with Comparative Examples 1 and 2. Therefore, the amount of resin used can be saved and the size of the ion exchange module can be reduced. As is clear from FIG. 3, the ion exchange zones of Examples had lengths smaller than those of Comparative Examples. This is because the diffusion rate does not significantly vary even if the flow rate increases.

INDUSTRIAL APPLICABILITY

The ion adsorption module of the present invention can be extremely easily filled with an ion exchange material, and the packed layer does not move even if the layer is placed in an upward flow. In the ion adsorption module and the water treatment method of the present invention, the length of the ion exchange zone may be small even at an increased flow rate, allowing the ion exchange material apparatus to have a reduced size, and leakage of a slight amount of adsorbed ions does not hardly occur, resulting in a reduced regeneration frequency and an improved treatment efficiency.

The invention claimed is:

1. An ion adsorption module comprising
   a container with an opening wherein at least one feed water flows into the opening and
   an organic porous ion exchange material comprising an organic porous cation exchange material and an organic porous anion exchange material and having a three-dimensional reticular structure comprised in the container,
   wherein the ion exchange material has a continuous pore structure comprising macropores and mesopores,
   the macropores are interconnected with each other to form the mesopores having an average diameter of 1-1,000 μm in the interconnected parts,
   the ion exchange material has a total pore volume of 1-50 ml/g,
   the ion exchange material comprises uniformly distributed ion exchange groups,
   the ion exchange material has an ion exchange capacity of 0.5 mg equivalent/g or more of the porous material on a dry basis, and
   wherein the module comprises a stratified bed wherein each bed comprises the organic porous ion exchange material comprising the organic porous cation exchange material and the organic porous anion exchange material.

2. The module according to claim 1, wherein the container further comprises a feed water inflow pipe connected to the opening and a treated water outflow pipe, wherein the feed water flows into the opening.

3. An ion adsorption module comprising
   a layer of at least one ion exchange resin particles and
   a downstream layer of an organic porous ion exchange material comprising an organic porous cation exchange material and an organic porous anion exchange material and having a three-dimensional reticular structure,
   wherein the ion exchange material has a continuous pore structure comprising macropores and mesopores,
   the macropores are interconnected with each other to form the mesopores having an average diameter of 1-1,000 μm in the interconnected parts,
   the ion exchange material has a total pore volume of 1-50 ml/g,
   the ion exchange material comprises uniformly distributed ion exchange groups,
   the ion exchange material has an ion exchange capacity of 0.5 mg equivalent 1g or more of the porous material on a dry basis, and
   wherein the module comprises a stratified bed wherein each bed comprises the organic porous ion exchange material comprising the organic porous cation exchange material and the organic porous anion exchange material.

4. The module according to claim 2, wherein the module is disposed on the downstream side of another ion adsorption module which comprises at least one ion exchange resin particles.

5. A water treatment method comprising removing ionic substances from at least one feed water by adsorption by contacting the feed water with an organic porous ion exchange material comprising an organic porous cation exchange material and an organic porous anion exchange material and having a three-dimensional reticular structure,
   wherein the ion exchange material has a continuous pore structure comprising macropores and mesopores,
   the macropores are interconnected with each other to form the mesopores having an average diameter of 1-1,000 μm in the interconnected parts,
   the ion exchange material has a total pore volume of 1-50 ml/g,
   the ion exchange material comprises uniformly distributed ion exchange groups, and
   the ion exchange material has an ion exchange capacity of 0.5 mg equivalent 1g or more of the porous material on a dry basis, and
   wherein said organic porous material is comprised in an ion adsorption module and the module comprises a stratified bed wherein each bed comprises the organic porous ion exchange material comprising the organic porous cation exchange material and the organic porous anion exchange material.

6. The method according to claim 5, wherein the feed water has been treated prior to said removing ionic substances with at least one ion exchange resin particles.

7. The module according to claim 1, wherein the module is disposed on the downstream side of another ion adsorption module which comprises at least one ion exchange resin particles.

* * * * *

UNITED STATES PATENT AND TRADEMARK OFFICE
CERTIFICATE OF CORRECTION

PATENT NO. : 7,294,265 B2 Page 1 of 1
APPLICATION NO. : 10/510964
DATED : November 13, 2007
INVENTOR(S) : Akiko Yoshida et al.

It is certified that error appears in the above-identified patent and that said Letters Patent is hereby corrected as shown below:

On the title page, Item (22), should read:

-- PCT Filed: July 14, 2003 --

Signed and Sealed this

First Day of April, 2008

JON W. DUDAS
*Director of the United States Patent and Trademark Office*